Patented Feb. 28, 1950

2,499,213

UNITED STATES PATENT OFFICE 2,499,213

QUATERNATED 3,5-DIMETHYLPHENYL ETHERS

Peter L. de Benneville, Philadelphia, Pa., Leonard J. Armstrong, Wenona, Ill., and Louis H. Bock, Huntingdon Valley, Pa., assignors to Röhm & Haas Company, Philadelphia, Pa., a corporation of Delaware No Drawing. Application August 19, 1947, Serial No. 769,528

5 Claims. (Cl. 260—297)

This invention deals with quaternary ammonium salts. More particularly, it concerns phenyl ethers in which phenyl rings carry two methyl groups in the positions meta to the ether function and also carry quaternary ammonium groups bound thereto through a methylene linkage. The method of preparation of such compounds is also part of this invention.

Although it has already been proposed to react some halomethyl compounds with amines to form quaternary ammonium compounds, the 3,5-dimethylphenyl ethers having a quaternary ammonium methyl substituents in the phenyl rings have not been known. These new compounds have now been found to form a unique class having individual properties which set it apart from previously known quaternary compounds or phenyl ethers.

The new compounds here described and claimed are characterized by the facility with which they react with cellulose to yield new cellulose ethers having a valuable new combination of properties. It has been found that the phenyl ethers of this invention, characterized by methyl groups in the 3- and 5-positions of the phenyl rings, the ether function being accorded the one-position, and characterized by quaternary ammonium methyl groups, also as phenyl substituents, react with cellulose at the hydroxyl groups thereof, splitting out an amine salt and forming new cellulose ethers. This reaction occurs with relative ease under conditions of temperature and pressure which do not unduly tender the treated cellulose. Somewhat similar quaternary compounds, lacking, however, the full configuration described, are not thus reactive nor effective in this way.

The compounds of this invention have the general formula

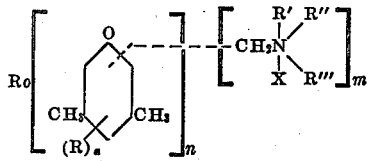

wherein $a$ is a number from zero to one; $n$ is an integer from one to two, $m$ is an integer having a value from one up to a value of $3n$; R is a member of the class consisting of alkyl groups and acyl groups of preferably one to eighteen carbon atoms; Ro is a monovalent aliphatic hydrocarbon group of one to eighteen carbon atoms when $n$ has a value of one and is a divalent aliphatic group from the class consisting of alkylene groups of two to three carbon atoms and saturated aliphatic ether chains having two to three carbon atoms between oxygen atoms when $n$ has a value of two; R', taken individually, represents one of the groups from the class consisting of methyl, ethyl allyl, methallyl, and benzyl groups; R'' and R''', taken individually, represent a methyl or ethyl group; R'' and R''', taken together, represent a divalent saturated aliphatic group from the class consisting of hydrocarbon chains and ether chains which jointly with the nitrogen form a heterocycle; R', R'', and R''', taken together, represent a trivalent unsaturated hydrocarbon chain which jointly with the nitrogen forms a heterocycle; and X is an anion, particularly a halogen.

The group Ro, when monovalent, may be an aliphatic hydrocarbon group of one to eighteen carbon atoms, preferably saturated. It may have a straight or branched chain and may be saturated or unsaturated. Typical groups for Ro as a monovalent hydrocarbon radical are methyl, ethyl, propyl, butyl, amyl, hexyl, octyl, decyl, dodecyl, cetyl, octadecyl, and isomers thereof including isopropyl, isobutyl, sec.-butyl, ethylhexyl, capryl, isononyl, 1-methyl-4-ethyloctyl, or 1-sec.-butyl-4-ethyloctyl, and unsaturated groups such as allyl, methallyl, crotyl, undecenyl, or octadecenyl. Larger groups may be used, but are not readily available. The preparation of phenyl ethers is known and the usual methods may be applied to the preparation of ethers of 3,5-dimethylphenol or sym.-xylenol.

When Ro is divalent, polyethers are formed. The phenyl groups form the terminal members thereof. Between the oxyphenyl groups there occurs an ethylene or propylene chain or a divalent aliphatic ether chain in which oxygen atoms are separated by alkylene chains of two to three carbon atoms. Thus, Ro may be ethylene, —CH2CH2—, trimethylene, —CH2CH2CH2—, propylene, —CH(CH3)CH2—, ethoxyethyl, —CH2CH2OCH2CH2—, propoxypropyl,

—C3H6OC3H6— ethoxyethoxyethyl,

—CH2CH2OCH2CH2OCH2CH2— or the like, including

—CH2CH(CH3)O(CH3)CHCH2—

The polyethers are formed from 3,5-dimethylphenol by reaction with a dihaloethane or dihalopropane or with a dihaloalkyl ether, such as dichloroethyl ether, dibromotrimethylene, dibromopropyl ether, dichlorotriglycol, or the like, in the presence of a strong base.

The group R, when present, replaces one of the nuclear hydrogens. It may be an alkyl group of one to eighteen carbon atoms, such as methyl, ethyl, propyl, isopropyl, butyl, amyl, hexyl, heptyl, octyl, isooctyl, diisobutyl or tert.-octyl, decyl, dodecyl, cetyl, or octadecyl, or even larger groups such as tetracosyl. R may also represent an acyl group, such as acetyl, propionyl, butyryl, hexoyl, 2-ethylhexoyl, dodecanoyl, oleyl, or stearoyl, or larger group such as tetracosanoyl. Acyl groups are readily introduced in the phenyl rings by the Friedel-Crafts reaction, as with aluminum chloride. They may be reduced, as with zinc and acid, to the corresponding hydrocarbon group.

When R or Ro are groups containing five or more carbon atoms, the resulting compounds cause a profound change in the nature of cellulose upon reaction therewith. The new cellulose ethers formed thus with substituents of five or more carbon atoms are but slightly absorptive to water. With groups of twelve or more carbon atoms there is fair repellency of water which is most marked when $C_{16}$ to $C_{24}$ groups are present. Since $C_{16}$ and $C_{18}$ groups are the most readily available of these, these will usually be used for this purpose.

The reactive functional group of the compounds of this invention is the quaternary ammonium methyl substituent

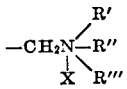

which replaces one or more of the available ring hydrogens. Where all three positions of the phenyl ring, the 2-, 4-, and 6-positions, are available for substitution, it is possible to introduce one or two such substituents readily and in many cases a third in the same ring. When two rings are present, as in the polyethers, each ring may be thus substituted. When an R group is present in the ring, it is, of course, possible to introduce only two quaternary ammonium methyl groups.

As stated above, R', R'', and R''' may be the specified individual groups. A particularly valuable subclass results, however, when R', R'', or R''' form parts of multivalent substituents. When all three are taken together, a trivalent unsaturated chain is at hand. It forms a heterocycle with the nitrogen, as in pyridine, alpha-picoline, beta-picoline, quinoline, isoquinoline, or other heterocyclic tertiary amine. When R'' and R''' are taken together, they form a divalent saturated chain, which is either a hydrocarbon chain as in the —CH₂CH₂CH₂CH₂— chain of pyrollidine, the —CH₂CH₂CH₂CH₂CH₂— chain of piperidine, or an aliphatic ether chain as in morpholine. These cyclic amines seem to have some fluxing effect when the quaternated phenyl ethers are reacted with cellulose.

The introduction of the N-methyl substituent is accomplished through the steps of halomethylating the phenyl ring or rings and converting the halomethylated compound to a quaternary ammonium salt. This may be done by reacting the halomethylphenyl ether with a secondary amine, such as morpholine, piperidine, pyrollidine, dimethylamine, diethylamine, or the like, to form a tertiary amine which is then reacted with an alkylating agent or aralkylating agent, such as methyl iodide, ethyl bromide, ethyl sulfate, allyl chloride, or the like. Alternatively, the halomethylphenyl ether is reacted with a tertiary amine, such as trimethylamine, ethyldimethylamine, benzyldimethylamine, allyldimethylamine, methallyldiethylamine, triethylamine, benzyldiethylamine, methylmorpholine, pyridine, picoline, or the like.

The halomethylation step is performed with formaldehyde or with a revertible polymer thereof, such as alpha-trioxymethylene, or other compound readily yielding formaldehyde, such as dichloromethyl ether or a formal, such as dimethyl formal or diethyl formal, and a hydrogen halide in excess. The temperature of the halomethylation reaction may be from 0° to 100° C. If desired, the reaction may be effected in the presence of an acidic catalyst, such as zinc chloride, chlorosulfonic acid, or sulfuric acid. The ethers of 3,5-dimethylphenol and aliphatic alcohols of one to four carbon atoms are best halomethylated at lower temperatures, such as 0° to 25° C. without a catalyst, particularly when only one halomethyl group is to be introduced or even two halomethyl groups are to be introduced. More vigorous reaction conditions, such as the presence of one of the indicated catalysts or elevated temperatures, are necessary for the introduction of another halomethyl group. This is particularly true in regard to halomethylation of ethers with long-chained substituents. Halomethylation is desirably carried out in an inert solvent such as a hydrocarbon or a chlorinated solvent.

In one method for the conversion of a halomethylated phenyl ether to the quaternary ammonium compound, a halomethylated phenyl ether and a tertiary amine may be reacted directly, although it is generally more desirable to effect the reaction in an organic solvent, such as benzene, toluene, xylene, ethylene dichloride, nitromethane, ethyl acetate, naphtha, or the like. The reaction mixture is heated to 20° to 150° C., usually under reflux if a solvent is used, until the quaternization is substantially completed.

The same general procedure is followed when the halomethylated phenyl ether is first reacted with a secondary amine and the tertiary amine thus formed reacted with an alkylating agent. This method permits a somewhat greater choice of N-substituents, but is not applicable, of course, where such groups as pyridine may be desired.

The reaction product is usually separated from the reaction mixture by evaporation of solvent or crystallization. Purification by such steps as charcoaling, solvent-extracting, or the like may be used.

Preparation of typical quaternary ammonium compounds of this invention is illustrated in the following examples.

*Example 1*

A mixture of 47 parts of paraformaldehyde, 108 parts of 3,5-dimethylanisole, 57.5 parts of concentrated hydrochloric acid with 360 parts of carbon tetrachloride as solvent was agitated and a rapid stream of dry hydrogen chloride passed in over a period of five hours without heating, and for an additional two hours at 70° C. The solid which formed was washed by decantation and dried in vacuo. There was thus recovered 168.5 parts of a crystalline solid, which melted at 122°–126° C. After recrystallization from a mixture of benzene and ligroin, the chloromethylation product melted at 135°–137° C. By analysis (Cl, 29.4; theory 30.4) it corresponded to bis-chloromethyl-3,5-dimethylanisole.

Ten parts of the chloromethylation product and 13.4 parts of benzyldimethylamine dissolved in 20 parts of benzene were heated for ten hours at 50° C. The product was removed by filtration and dried. There was thus obtained 21.7 parts of the colorless, crystalline diquaternary salt. The analysis of this salt, Cl, 14.5; theory 14.1
N, 5.39; theory 5.56, indicated practically complete conversion to the desired quaternary form, the benzyldimethylamine diquaternary salt of bis-chloromethyl-3,5-dimethylanisole.

Example 2

To a solution of 46.6 parts of the recrystallized chloromethylation product obtained in the above example in 130 parts of benzene at 60° C. was added 13.5 parts of benzyldimethylamine. The mixture was refluxed 1.5 hours. The colorless, crystalline product was removed by filtration, washed well with benzene and acetone, and dried. There was obtained 29.5 parts of the monoquaternary salt, completely soluble in water. Analysis (equivalent weight by ionizable Cl 186, theory 184, Cl, 18.6; theory 19.3
N, 3.68; theory 3.80)

showed this compound to be the benzyldimethylamine monoquaternary salt of bis-chloromethyl 3,5-dimethylanisole, which behaves as a strong acid.

Example 3

A mixture of 48 parts of paraformaldehyde and 54.4 parts of 3,5-dimethylanisole in 160 parts of carbon tetrachloride was agitated at 0° C. and 15.1 parts of cholorosulfonic acid added over a period of two and one-half hours, the temperature being held at 30° C. or less by cooling. After one hour of additional stirring, the mixture was poured on ice-water and filtered. The crude product was recrystallized from a mixture of benzene and ligroin to yield 63 parts of the trischloromethylation product melting at 125°–127° C. The same product can be obtained in a similar manner from the chloromethylation product of 3,5-dimethylanisole previously described. When recrystallized once again, the material melted at 129°–130° C. Analysis showed:

Cl, 36.3; theory 37.8
C, 51.5; theory 51.4
H, 5.63; theory 5.35.

A mixture of 15 parts of the chloromethylation product, 23 parts of benzyldimethylamine and 86 parts of benzene was refluxed seven hours. It was filtered to yield, after drying, 28 parts of a yellow solid material essentially water-soluble, corresponding in composition to the benzyldimethylamine quaternary salt of trischloromethyl-3,5-dimethylanisole.

Example 4

Seventy-five parts of the chloromethylation product described in Example 1 was dissolved in 500 parts of benzene; the solution was cooled in ice-water and trimethylamine gas passed in at a fairly rapid rate until no more heat was evolved. Precipitation of the product was complete in one hour. The white, crystalline product was filtered off and dried in vacuo to yield 120 parts of the quaternary salt. By analysis this proved to be the trimethylamine diquaternary salt of bis-chloromethyl-3,5-dimethylanisole.

Example 5

To a solution of 56 parts of potassium hydroxide in 355 parts of ethanol was added 122 parts of 3,5-dimethylphenol. The solution was brought to reflux and 272 parts of n-amyl chloride added dropwise. The mixture was refluxed 14 hours with agitation, the precipitated salt filtered off, and the alcohol removed from the filtrate by distillation. The residue was distilled in vacuo, yielding 115.5 parts of product, boiling at 130° to 150° C. at 25 mm. Hg. The distillate was washed twice with 150 parts of 10% potassium hydroxide, then with water, and redistilled. There was obtained 76 parts of 3,5-dimethylphenyl amyl ether, boiling at 145° to 148° C. at 25 mm. Hg, having the analysis C, 81.6; theory 81.3
H, 10.5; theory 10.4.

A mixture of 22 parts of paraformaldehyde, 70 parts of the above ether, 118 parts of concentrated hydrochloric acid, and 400 parts of carbon tetrachloride as solvent was agitated and dry hydrogen chloride passed in while the mixture was cooled during the course of one and one-half hours. The reaction mixture was then heated at 70° C. for four hours. The organic layer was separated, washed with water, and concentrated in vacuo. The resulting product was dissolved in benezene, rewashed with water, and again concentrated by heating in vacuo to remove solvents. There was thus obtained 70 parts of the monochloromethylation product, a viscous, light yellow liquid, giving the analysis Cl, 13.8; theory 14.8
C, 70.8; theory 70.3
H, 8.69; theory 8.40.

Seventy parts of the above chloromethylation product was dissolved in 120 parts of benzene and 39.5 parts of benzyldimethylamine added dropwise at room temperature. The mixture was stirred four hours at room temperature and then for a short while at reflux. The product was filtered off and dried in vacuo. The product was identified as the benzyldimethylamine quaternary salt of chloromethyl-3,5-dimethylphenyl amyl ether.

Example 6

3,5-dimethylphenyl dodecyl ether was prepared in similar manner to the amyl ether from 28 parts of potassium hydroxide, 167 parts of dodecyl bromide, and 61 parts of 3,5-dimethylphenol in 155 parts of isopropanol as solvent. After one distillation there was obtained 113 parts of the ether, boiling at 160° to 200° C. at 1 mm., having the analysis:

C, 80.2; theory 82.8
H, 10.9; theory 11.7.

A mixture of 233 parts of 3,5-dimethylphenyl dodecyl ether, 37.5 parts of paraformaldehyde, and 350 parts of concentrated hydrochloric acid was agitated and dry hydrogen chloride passed in for two hours without external heat being applied and for ten hours at steam-bath temperature. The product layer was dissolved in benzene, washed with water, dried over anhydrous sodium sulfate, and the benzene removed in vacuo on the steam-bath. There was obtained 223 parts of the monochloromethylation product as a clear, amber oil, having the analysis:

Cl, 9.29; theory 10.4.

The quaternary salt was prepared from 180 parts of the chloromethylation product and 75 parts of benzyldimethylamine in 175 parts of benzene as solvent at reflux for six hours. The solvent was removed by heating on the steam-bath at 30–35 mm. to yield 230 parts of the quaternary salt as a yellow, waxy solid. The salt corresponded in composition to the benzyldimethylamine quaternary salt of chloromethyl-3,5-dimethylphenyl dodecyl ether.

*Example 7*

In the same manner as the dodecyl ether above, from 122 parts of 3,5-dimethylphenol, 305 parts of cetyl bromide, 56 parts of potassium hydroxide and 275 parts of isopropanol was obtained 250 parts of 3,5-dimethylphenyl cetyl ether, boiling between 187° and 220° C. at 1.5 mm. of Hg, having the analysis C, 81.6; theory 83.3
H, 11.9; theory 12.1.

Hydrogen chloride gas was passed rapidly into a mixture of 200 parts of the ether, 24 parts of paraformaldehyde, and 350 parts of concentrated hydrochloric acid during the course of 18 hours, the reaction and isolation being as described above for the dodecyl homologue. There was obtained 208 parts of a brown liquid, having the analysis Cl, 8.25; theory 9.00.

The quaternary salt was prepared from 100 parts of the chloromethylation product and 44.5 parts of benzyl dimethylamine in 130 parts of benzene at steam-bath temperature for eight hours. The benzene was removed in vacuo and excess amine removed in vacuo over sulfuric acid. There was obtained 108 parts of a waxy product, having the analysis Cl, 5.94; theory 6.70
N, 2.80; theory 2.65 and this corresponded to the benzyldimethylamine quaternary salt of chloromethyl-3,5-dimethylphenyl cetyl ether.

*Example 8*

Preparation throughout was similar to that for the dodecyl and cetyl ethers described above. From 93 parts of 3,5-dimethylphenol, 333 parts of octadecyl bromide, and 45 parts of potassium hydroxide in 320 parts of methanol was obtained 207 parts of 3,5-dimethylphenyl octadecyl ether, boiling at 205° to 235° C. at 1.5 to 2 mm., a colorless, waxy solid on cooling.

Hydrogen chloride gas was passed rapidly into a mixture of 207 parts of 3,5-dimethylphenyl octadecyl ether, 25 parts of paraformaldehyde and 350 parts of concentrated hydrochloric acid at steam-bath temperature for 19 hours. The product was isolated as described for the dodecyl ether. There was thus obtained 210 parts of the clear orange liquid monochloromethylation product, which, on standing, solidified to a waxy solid.

The quaternary salt was prepared from 100 parts of the chloromethylation product and 45 parts of benzyldimethylamine in 130 parts of benzene at steam-bath temperature for six hours. The benzene was removed by heating in vacuo on the steam-bath, and the product freed of amine over sulfuric acid in vacuo. There was thus obtained 130 parts of the brown, waxy quaternary salt corresponding to the benzyldimethylamine quaternary salt of chloromethyl-3,5-dimethylphenyl octadecyl ether.

*Example 9*

To a solution of 20 parts of bis-chloromethyl-3,5-dimethylanisole in 110 parts of benzene was added 13.6 parts of pyridine dropwise at room temperature while the mixture was agitated. After the mixture has stood at room temperature for two hours, it was stirred three hours at reflux, and the product was then removed and dried in vacuo at steam-bath temperature. Twenty parts of the hygroscopic, colorless, crystalline quaternary was obtained, corresponding in composition to pyridine diquaternary salt of bis-chloromethyl-3,5-dimethylanisole.

*Example 10*

A solution of 71 parts of 3,5-dimethylanisole in 400 parts of sym.-tetrachloroethane was cooled to 0° C. and 71 parts of anhydrous powdered aluminum chloride added while the solution was stirred. To this mixture there was slowly added 40.8 parts of acetyl chloride while the reaction mixture was stirred and cooled so as to keep the temperature below 10° C. The mixture was stirred with cooling for three hours, then was allowed to come to room temperature and was left standing overnight. It was then poured on chopped ice and the tetrachloroethane layer filtered, dried, and distilled through a Vigreux column. The fraction boiling at 147°–150° C. at 24 mm. was collected. This amounted to 74.8 parts of acetyl-3,5-dimethylanisole, a clear liquid crystallizing on cooling. The material thus obtained was analyzed as follows:

C, 73.0% (theory 74.1)
H, 7.82% (theory 7.86).

A mixture of 31 parts of the above acetylated ether, 10.5 parts of paraformaldehyde, and 88 parts of concentrated hydrochloric acid was heated and stirred on the steam-bath while hydrogen chloride gas was passed in rapidity. When the product formed a gum, 160 parts of sym.-tetrachloroethane was added as solvent, and hydrogen chloride gas passed in for another three hours. The tetrachloroethane layer was separated and dried in vacuo giving a semi-crystalline product which was recrystallized twice from a mixture of benzene and ligroin to yield 13.5 parts of a somewhat sticky, crystalline solid, melting from 123° to 127° C., corresponding in composition to bis(chloromethyl) acetyl-3,5-dimethylanisole.

A mixture of 13.5 parts of this chloromethylation product and 14 parts of benzyldimethylamine was heated in 25 parts of benzene at 60°–70° C. for ten hours. The benzene was removed. By titration, quaternization of both chloromethyl groups was incomplete, and the crude quaternary was again refluxed in benzene with five additional parts of benzyldimethylamine for eight hours. The product was filtered and dried in vacuo to yield 23 parts of the colorless, crystalline diquaternary salt, benzyldimethylamine diquaternary salt of bis-chloromethyl-acetyl-3,5-dimethylanisole. The equivalent weight of this compound by ionizable chlorine was found to be 279 (theory 273).

Example 11

A mixture of 49 parts of acetyl-3,5-dimethylanisole, 125 parts of amalgamated zinc, 135 parts of xylene, and 30 parts of concentrated hydrochloric acid was stirred and heated at reflux for eight hours with continuous passage of dry hydrogen chloride. The xylene layer was then separated, the xylene removed, and the product distilled at 85° C. at 25 mm. to 112° C. at 30 mm. to yield 24 parts of the colorless liquid product, ethyl-3,5-dimethylanisole.

A mixture of 24 parts of this ether with 9 parts of paraformaldehyde, 60 parts of concentrated hydrochloric acid, and 60 parts of glacial acetic acid was heated on the steam-bath with stirring while a rapid stream of dry hydrogen chloride was passed in for three hours. There was added 60 parts additional of glacial acetic acid and the reaction was continued an additional four hours. The product was dissolved in ethylene dichloride and washed with water. The ethylene dichloride was removed by heating in vacuo. The product was again treated with 70 parts of ethylene dichloride, 30 parts of glacial acetic acid, 60 parts of concentrated hydrochloric acid, and 5 parts of paraformaldehyde for five hours more and isolated in the same way to yield 21 parts of the chloromethylated product as a sticky solid.

A mixture of 21 parts of the chloromethylated product and 25 parts of benzyldimethylamine was refluxed in 88 parts of benzene for eight hours. The solid was filtered off, washed, and dried to yield 35.5 parts of the quaternary salt, the benzyldimethylamine quaternary salt of chloromethylated ethyl-3,5-dimethylanisole.

The equivalent weight by ionizable chlorine is 325 as compared to the theory for monoquaternary salt, 348; for diquaternary salt, 266. The product is, therefore, a mixture of the two.

Example 12

(a) A mixture of 17.4 parts of bis(chloromethyl)-3,5-dimethylanisole and 17 parts of N-methylpiperidine was refluxed in 80 parts of benzene for five hours. A resinous solid separated from the solution. It was removed, washed with benzene, and dried to yield 26.2 parts of the yellowish solid quaternary salt, the N-methylpiperidine diquaternary salt of bis-chloromethyl-3,5-dimethylanisole.

The equivalent weight by ionizable chlorine is 233 (theory 216).

(b) A mixture of 11.6 parts of bis(chloromethyl)-3,5-dimethylanisole and 11 parts of N-methylmorpholine in 90 parts of benzene was refluxed for nine and one-half hours to yield 12.9 parts of a colorless, crystalline diquaternary salt, the N-methylmorpholine diquaternary salt of bis-chloromethyl-3,5-dimethylanisole.

The equivalent weight by ionizable chlorine is 191 (theory 217).

Example 13

A mixture of 24 parts methallyldimethylamine and 20.5 parts of bis(chloromethyl)-3,5-dimethylanisole in 90 parts of benzene was refluxed for five hours. The reaction mixture was again refluxed with 10 parts of additional amine in 65 parts of benzene for five hours. There was thus obtained 21.7 parts of the colorless, crystalline diquaternary salt, methallyldimethylamine diquaternary salt of bis-chloromethyl-3,5-dimethylanisole.

The equivalent weight by ionizable chlorine was 210 (theory 216).

Example 14

Fifty parts of bis(chloromethyl)-3,5-dimethylanisole, 153 parts of a 25% solution of dimethylamine in water, and 19.8 parts of sodium hydroxide were placed in an autoclave and heated at 150° C. with rocking for five hours. The contents were then ether-extracted and dried over anhydrous sodium sulfate. The ether was removed and the product distilled. Bis(dimethylaminomethyl)-3,5-dimethylanisole was collected at 175°–182° C. at 20–22 mm. Forty-two parts of this product was obtained as a clear, thick oil. The neutralization equivalent of this material was 135 (theory 125).

A mixture of 12 parts of bis(dimethylaminomethyl)-3,5-dimethylanisole and 18 parts of benzyl bromide was refluxed in 175 parts of benzene for eight hours. Quaternization was found to be incomplete at this point. The reaction product was, therefore, refluxed with an additional eight parts of benzyl bromide in 100 parts of benzene for an additional five hours. The solid so formed was removed, well washed by grinding under petroleum ether, and dried in vacuo to yield 14.6 parts of the benzyl bromide diquaternary salt of bis(dimethylaminomethyl)-3,5-dimethylanisole.

In similar manner, the diquaternary salt was prepared using benzyl chloride to yield the same compound as previously obtained by quaternization of bis(chloromethyl)-3,5-dimethylanisole with benzyldimethylamine.

Example 15

A solution of 97.3 parts of 3,5-dimethylanisole in 560 parts of tetrachloroethane was cooled to 10° C. in an ice-bath and 98.4 parts of anhydrous aluminum chloride added rapidly while the solution was stirred. To this mixture was added 225 parts of stearoyl chloride while the reaction mixture was cooled and stirred at such a rate that the temperature did not rise above 10° C. Stirring and cooling were continued for five hours, and the mixture was then allowed to stand at room temperature overnight. It was then poured on ice and the tetrachloroethane removed by steam-distillation. On cooling, the product solidified as a waxy, tan-colored solid. This was filtered, melted, and stirred with hot 10% sodium carbonate solution, cooled, and refiltered. It was then dried in vacuo on the steam-bath to yield 332 parts of crude product. This product was dissolved in hot ligroin, filtered and cooled to yield 132 parts of the pure product, stearoyl-3,5-dimethylphenyl methyl ether, a soft, white powder melting at 55°–57° C., giving analyses as follows:

Per cent C, 80.5 (theory 80.6) and
Per cent H, 11.7 (theory 11.4).

A mixture of 93 parts of the purified product obtained above, 7.8 parts of paraformaldehyde, 85 parts of concentrated hydrochloric acid, and 130 parts of glacial acetic acid was heated on the steam-bath and stirred under reflux while hydrogen chloride gas was passed in for 15 hours. The solid, which formed on cooling, was filtered, washed well with water, and crystallized from benzene. There was obtained 60 parts of a light tan powder, melting at 67°–70° C., having a chlorine content of 7.36% (theory for the monochloromethylation product is 7.88%).

A mixture of 20 parts of the chloromethylation product with 6 parts of benzyldimethylamine in 70 parts of benzene was heated under reflux while the mixture was stirred at 50°–60° C. for 24 hours. The benzene was then removed in vacuo to yield 22 parts of the benzyldimethylamine quaternary salt of chloromethyl-stearoyl-3,5-dimethylanisole, a whitish powder, giving the following analyses:

per cent Cl, 5.48 (theory 6.06) and
per cent N, 2.39 (theory 2.39).

*Example 16*

Two hundred fifty parts of mossy zinc were amalgamated by stirring with 25 parts of mercuric chloride, 14 parts of concentrated hydrochloric acid, and 300 parts of water for ten minutes. The aqueous layer was poured off, concentrated hydrochloric acid added to half-cover the zinc, and a solution of 100 parts of stearoyl-3,5-dimethylanisole in 260 parts of xylene added. The mixture was stirred and refluxed while hydrogen chloride gas was passed through for 21½ hours. The xylene layer was separated, washed with water, and the xylene removed by distillation in vacuo. This left a residue which solidified when cool. It was recrystallized from ligroin. There was thus obtained 65 parts of white, waxy solid, octadecyl 3,5-dimethylanisole, melting at 54.5°–56.5° C. which gave the following analyses:

per cent C, 81.0 (theory 83.5) and
per cent H, 12.3 (theory 12.4).

A mixture of 63 parts of the above ether, 5.3 parts of paraformaldehyde, 60 parts of concentrated hydrochloric acid and 75 parts of glacial acetic acid was heated and stirred under reflux while HCl gas was passed in for 16 hours. The resulting product was dissolved in benzene and washed with water. The benzene was then removed. After recrystallization from ligroin, 52 parts of white powder, melting at 75°–77° C., chloromethyl octadecyl 3,5-dimethylanisole, was obtained, having a chlorine analysis of 7.78% (theory 8.16).

A mixture of 46 parts of the chloromethylated ether and 16 parts of benzyldimethylamine in 88 parts of benzene was refluxed for eight hours while the mixture was stirred, the benzene was removed in vacuo, and the soft solid resulting was dried in vacuo over sulfuric acid to remove excess amine. There was obtained as a yellowish, waxy solid 54 parts of the benzyldimethylamine quaternary salt of chloromethyl octadecyl-3,5-dimethylanisole.

*Example 17*

To a solution of 28.5 parts of sodium metal in 500 parts of ethanol were added 150 parts of 3,5-dimethylphenol and 49.5 parts of ethylene chloride. The mixture was refluxed 26.5 hours with agitation. The ethanol was removed by distillation. The solid residue thus obtained was dissolved in ether, washed with water, and dried over anhydrous sodium sulfate. On removal of the ether, there remained a solid residue which was recrystallized from a mixture of ethanol and methanol to yield 40 parts of bis-3,5-dimethylphenoxyethane, a tan, crystalline solid, melting at 97°–99° C., giving the following analyses:

Carbon 79.0% (theory 80.0%)
Hydrogen 7.74% (theory 8.15%).

Hydrogen chloride gas was passed into a mixture of 35 parts of bis-3,5-dimethylphenoxyethane, 25 parts of 37% formaldehyde solution, 70 parts of concentrated hydrochloric acid, and 160 parts of carbon tetrachloride. The mixture was heated with reflux and agitation for seven and one-half hours. The carbon tetrachloride layer was evaporated to dryness to yield a product which was ground under water in a mortar and dried in vacuo to yield 38 parts of the amorphous bis-chloromethylation product. From the chlorine analysis of this material (20.8%) there were 2.2 chloromethyl groups per molecule.

A mixture of 30 parts of this chloromethylation product and 23.8 parts of benzyldimethylamine was heated for three and one half hours at 60° C. in 100 parts of dioxane. The solvent was poured off, the hard, amorphous solid product broken out of the flask, triturated with anhydrous ether, filtered and dried to yield 45 parts of the quaternary salt, the benzyldimethylamine quaternary salt of bis-chloromethyl-sym.-bis-3,5-dimethylphenoxyethane.

*Example 18*

To a solution of 360 parts of sodium 3,5-dimethylphenolate in 400 parts of ethanol were added 2 grams of 250-mesh copper powder and, dropwise at reflux, 202 parts of trimethylene dibromide. The mixture was stirred and heated at reflux for 22 hours. The ethanol was removed by distillation and the residue dissolved in ether, washed with water, and recovered by evaporation of the ether. The product was then distilled in vacuo to yield, after discarding fore-runs, 131 parts of the di(3,5-dimethylphenoxy)propane, boiling at 200°–214° C. at 10 mm., melting at 39–41° C. after recrystallization from methanol. By analysis of this product, it contained Carbon 80.6% (theory 80.5%)
Hydrogen 8.34% (theory 8.45%).

Hydrogen chloride gas was passed into a mixture of 71 parts of 1,3-bis(3,5-dimethylphenoxy) propane, 15 parts of paraformaldehyde, 70 parts of concentrated hydrochloric acid, and 160 parts of carbon tetrachloride for three hours. The crude product was removed by filtration through fritted glass as a soft, gummy material which hardened on drying to an amorphous solid. There was thus obtained 62 parts of the desired product. From the chlorine analysis, 17.0%, this product contained 1.8 chloromethyl groups per molecule.

A mixture of 30 parts of this chloromethylation product and 19.5 parts of benzyldimethylamine in 80 parts of benzene was heated for four hours at 45°–60° C. The product crystallized and was removed by filtration and dried in vacuo to yield 49.5 parts of the benzyldimethylamine quaternary salt of bis-chloromethyl-1,3-bis-3,5-dimethylphenoxypropane. The equivalent weight by ionizable chlorine was 356 (theory 340).

*Example 19*

Anhydrous hydrogen bromide was passed into a mixture of 100 parts of 3,5-dimethylphenyl octadecyl ether, 16 parts of paraformaldehyde, 185 parts of ethylene dichloride, 75 parts of water, and 10 parts of glacial acetic acid at room temperature for eight hours, then at 40°–50° C. for twelve hours. The product separated as a light tan solid which was washed in sodium bicarbonate solution and dried to yield 140.4 parts of the bromomethylation product. This appeared to be mainly the dibromomethylation product, the analyses of which follow:

Bromine, 25.01%; theory: 17.2% (mono), 28.6% (di)

Carbon, 62.95%; theory: 69.5% (mono), 59.9% (di)

Hydrogen, 9.01%; theory: 10.2% (mono), 8.58% (di)

A solution of 15 parts of the above bromomethylation products, 5 parts of benzyldimethylamine, 8.2 parts of benzene, and 20 parts of nitromethane was heated at 40°-50° C. for 10 hours with stirring. The solvents were filtered off and the brown, waxy material that remained dried in vacuo with gentle heating. There resulted 11.7 parts of a brown solid quaternary salt, the benzyldimethylamine quaternary salt of bromomethylated 3.5-dimethylphenyl octadecyl ether, which was readily water-soluble.

The molecular weight by ionizable chlorine was 510 (theory: 415 (di), 602 (mono).

The compounds of this invention can be dissolved in water and the resulting solution applied to cellulosic materials by dipping, padding, or spreading. The excess solution may thus be removed and the treated cellulosic material dried and heated to temperatures from 220° to 320° F. Times of heating may vary from an hour to two or three minutes. The compound reacts with the cellulose, thus

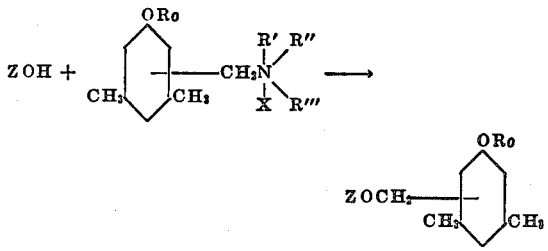

where Z represents a cellulose group carrying a hydroxyl group. After the reaction, the cellulosic material has new properties which are retained after washing. Nitrogenous decomposition products can be removed, but there is a definite increase in weight of the treated cellulosic material.

Compounds having two or more quaternary ammonium groups not only change the handle of cellulosic fabrics but also stabilize them against changes in dimensions. Compounds, whether mono- or poly-substituted, alter the handle, water-absorbency, and dyeing properties of fabrics, yarns, or fibers treated therewith.

In a series of applications different solutions at a uniform concentration of 10% were applied to pieces of a viscose rayon twill. Each piece of fabric was then dried and heated at 300° F. for 30 minutes. It was then washed in a hot water solution of a buffer salt at pH 7, rinsed in water several times, and then washed in hot alcohol. From weights taken at suitable times the amount of the compound reacting with the fabric was determined. The actual change in weight is conveniently compared with the theoretical gain in weight which should have resulted on the basis of the theoretical reaction shown above. See the table.

In the summary below the compounds shown are identified by the number of quaternary ammonium methyl groups and by indication of starting materials. For each compound there is given the percentage of the theoretical increase in weight which occurs. In the table all quaternary compounds were prepared with the same tertiary amine, benzyldimethylamine, in order to hold constant this variable. In every case the ether is substituted in the 3- and 5-positions of the phenyl ring with methyl groups.

Table

| No. of N Groups | Parent Ether | Weight Gain in Per Cent of Theory | |
|---|---|---|---|
| | | a | b |
| 1 | phenyl methyl | 55 | 46 |
| 2 | do | 91 | 88 |
| 1 | chloromethylphenyl methyl | | 54 |
| 3 | phenyl methyl | 72 | |
| 1 | phenyl amyl | 79 | 63 |
| 1 | phenyl dodecyl | 39 | |
| 2 | phenyl ethyl | 122 | (104) |
| 2 | bis(phenoxy)propane-1,3 | 78 | 93 |
| 2 | bis(phenoxy)ethane | 116 | (134) |
| 3 | sym.-phenoxyethyl | (123) | 118 |
| 1 | phenyl cetyl | 43 | (47) |
| 1 | phenyl octadecyl | | (90) |
| 2 | acetylphenyl methyl | 84 | (85) |
| 1 | ethylphenyl methyl | (92) | |
| 2 | phenyl methyl Bromine* | 75 | 72 |
| 2 | phenyl methyl Chlorine* | 61 | 78 | a—Results with 4% ammonium chloride as catalyst.
b—Results with 4% sodium hydroxide added.
( )—Results without added catalyst.
*—Made by reaction with sec. amine and reaction with indicated benzyl halide.

Similar results were obtained with other compounds. For example, the N-methylpiperidino derivative of bis-(chloromethyl)-3,5-dimethylanisole with sodium hydroxide as catalyst gave a weight gain of 50%. The comparable N-methylmorpholino derivative gave weight gains approximating 100% in a number of tests. The comparable methallyldimethyl diquaternary compound gave a weight gain of 51%. These tests show that the compounds of this invention react with cellulose by a permanent chemical linkage, resulting in modification of the cellulose. In place of the specific compounds named above, there may be used any other of the compounds coming within the general formula given above.

Within this general formula there are some subgroups of special interest. One subgroup may be represented by the formula

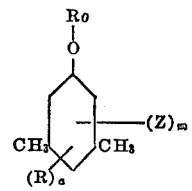

where $R_o$ is a monovalent hydrocarbon group, particularly an aliphatic hydrocarbon group of one to eighteen carbon atoms, R is an alkyl group or an acyl group, particularly groups of one to eighteen carbon atoms, $m$ is an integer from one to three, $a$ represents a number having values of zero and one, Z is the group

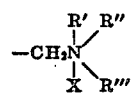

as has been previously defined. This subgroup of compounds is claimed in the instant case.

Another subclass of particular interest may be represented

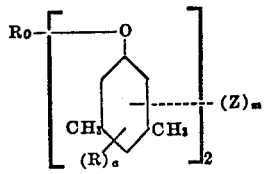

wherein Ro is a divalent aliphatic group from the class consisting of alkylene chains of two to three carbon atoms and saturated ether chains formed with alkylene chains of two to three carbon atoms, R represents an alkyl group or an acyl group, particularly groups of one to eighteen carbon atoms, $m$ is an integer having a value from one to six, and preferably from two to four, $a$ represents a number having values of zero and one, and Z is the group

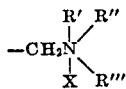

as previously defined. The subgroup of compounds in which Ro is a divalent group is claimed in application Serial No. 769,529, filed on even date by de Benneville and Bock.

We claim:
1. Compounds of the formula

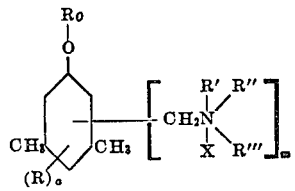

wherein Ro is a monovalent aliphatic hydrocarbon group of one to eighteen carbon atoms, R is a group having not over eighteen carbon atoms from the class consisting of alkyl groups and acyl groups from monocarboxylic acids consisting of an aliphatic hydrocarbon radical and a carboxyl group, $m$ is an integer from one to three, $a$ is a number from zero to one, the sum of $m$ and $a$ being not over three, R' taken individually represents a member of the class consisting of methyl, ethyl, allyl, methallyl, and benzyl groups; R'' and R''' taken individually represent a member of the class consisting of methyl and ethyl groups, R'' and R''' taken together represent a divalent saturated aliphatic group from the class consisting of the ether chain

—CH$_2$CH$_2$OCH$_2$CH$_2$— and alkylene chains of four to five carbon atoms which jointly with the nitrogen form a heterocycle, R', R'', and R''' taken together represent a hydrocarbon chain which jointly with the nitrogen forms a pyridine ring, and X is an anion.

2. Compounds of the formula

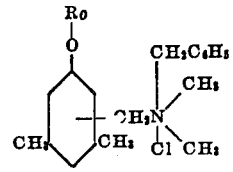

wherein Ro is an alkyl group of not over eighteen carbon atoms.

3. Compounds of the formula

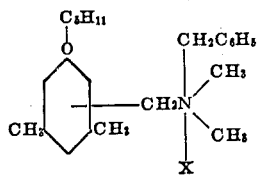

wherein X is a halogen.

4. Compounds of the formula

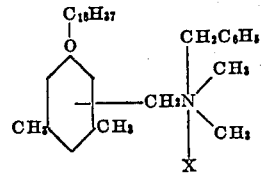

wherein X is a halogen.

5. The compound of the formula

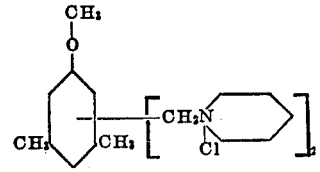

PETER L. DE BENNEVILLE.
LEONARD J. ARMSTRONG.
LOUIS H. BOCK.

REFERENCES CITED

The following references are of record in the file of this patent:

UNITED STATES PATENTS

| Number | Name | Date |
|---|---|---|
| 2,033,092 | Bruson | Mar. 3, 1936 |
| 2,036,916 | Bruson | Apr. 7, 1936 |
| 2,260,967 | Bruson | Oct. 28, 1941 |
| 2,383,775 | Craig et al. | Aug. 28, 1945 |
| 2,395,336 | McMullen et al. | Feb. 19, 1946 |

OTHER REFERENCES

Auwers: "Liebigs Annalen," vol. 334 (1904), pp. 271, 303 to 307.
Braun et al.: "Liebigs Annalen," vol. 490 (1931), pp. 198 and 199.